United States Patent [19]
Haddad

[11] 3,855,100
[45] Dec. 17, 1974

[54] ELECTROCHEMICAL ELECTRODE STRUCTURE

[75] Inventor: Ihsan A. Haddad, Bedford, Mass.

[73] Assignee: Instrumentation Laboratory, Inc., Lexington, Mass.

[22] Filed: Apr. 13, 1973

[21] Appl. No.: 350,774

[52] U.S. Cl....... 204/195 F, 204/195 G, 204/195 M
[51] Int. Cl.. G01n 27/36, G01n 27/40, G01n 27/46
[58] Field of Search............ 204/1 T, 195 R, 195 G, 204/195 F, 195 L, 195 M

[56] References Cited
UNITED STATES PATENTS

| | | | |
|---|---|---|---|
| 2,183,531 | 12/1939 | Allison | 204/195 F |
| 3,290,584 | 12/1966 | Van Deursen Harms et al. | 204/195 R |
| 3,705,089 | 12/1972 | Grubb | 204/195 F |
| 3,216,915 | 11/1965 | Arthur et al. | 204/195 G |
| 3,737,379 | 6/1973 | Tosteson | 204/195 L |
| 3,505,196 | 4/1970 | Dahms | 204/195 F |
| 3,272,731 | 9/1966 | Hutchison et al. | 204/195 F |

Primary Examiner—T. Tung

[57] ABSTRACT

An electrochemical electrode system includes a first chamber adapted to contain electrolyte and a second chamber adapted to contain the material to be analyzed. An opening is associated with each chamber and the openings are in juxtaposed relation to one another. The system further includes a flow control member that has a plurality of porous flow control sections of identical characteristics connected together for sequential positioning between the two openings. The member is movable to replace one section by another section between the openings, and structure is provided for sealing the two openings to the flow control section in position between the openings.

13 Claims, 4 Drawing Figures

PATENTED DEC 17 1974

3,855,100

ELECTROCHEMICAL ELECTRODE STRUCTURE

SUMMARY OF INVENTION

This invention relates to electrochemical electrode structures and more particularly to structures for liquid junctions in electrochemical electrode structures.

In electrochemical measurements, two electrodes—a measuring electrode and a reference electrode—are commonly employed in an arrangement whereby the potential difference between the two electrodes provides an indication of the concentration of a specific ion in the solution of interest. An electrochemical electrode structure of this type is used for measuring hydrogen ion concentration in a solution, for example, and a particular use of such an electrode system is for pH blood measurements.

A typical measurement of the pH of blood with a particular electrode system involves the measurement of the sum of a series of potentials: the potential of a silver-silver chloride reference electrode; the potentials on the inside and outside surfaces of a pH sensitive glass membrane, the blood sample to be measured being on the inside surface of the glass membrane; the junction potential occuring at the interface of the blood and a reference electrolyte solution (typically saturated KCl); and the potential of a calomel reference electrode. The potential generated on the blood side of the pH sensitive glass membrane ($E_{pH}$) and the liquid junction potential ($E_j$) are dependent on the composition of the blood sample. $E_{pH}$ is related to the acidity or pH of the blood; and $E_j$ is related to the differences of ionic mobilities in the blood and the reference electrolyte solution (due either to dissimilarity in composition and/or concentration), the three dimensional geometry of the blood-electrolyte interface, and the presence of colloidal particles in the blood.

A major source of difficulty in making blood pH measurements resides not in the pH electrode itself but at the interface (reference junction) between the blood and the reference electrolyte solution. Reference junctions can be divided into two general categories: open junctions and restricted flow junctions. The open junction can be considered a single orifice of macroscopic dimensions, while the restricted flow junction can be considered a collection of microscopic open junctions, such as provided by ceramic plug. The restricted flow type of junction offers advantages over the open type as flow of the reference solution is limited and valving and pressure differential requirements are simplified or eliminated. However, the characteristics of restricted flow junctions can change over a period of time, due for example to the clogging of a portion of the microscopic channels or pores.

It is an object of this invention to provide a novel and improved ionic junction arrangement of the restricted flow type for an electrochemical electrode system.

Another object of the invention is to provide a novel and improved leak structure arrangement of the restricted flow type which is particularly adapted for use in electrochemical measurements of blood.

Another object of the invention is to provide a novel and improved arrangement which facilitates replacement of a restricted flow ionic junction component when the effectiveness of such component has become impaired.

In accordance with the invention, an electrochemical electrode system includes a first chamber adapted to contain electrolyte and a second chamber adapted to contain the material to be analyzed. An opening is associated with each chamber and the openings are in juxtaposed relation to one another. The system further includes a flow control member that has a plurality of porous flow control sections of identical characteristics connected together for sequential positioning between the two openings. The member is movable to replace one section by another section between the openings, and structure is provided for sealing the two openings to the flow control section in position between the openings.

In a preferred embodiment, the flow control member is a strip of hydrophilic material in the form of a thin membrane that has a leading end secured to a take up member and a trailing end secured to a supply member. The membrane is a 10-micron thick strip of polycarbonate with a multiplicity of pores each being less than one-half micron, preferably about 0.1 micron, in diameter. The flow rate through the pores is less than 0.1 microliter per minute per square millimeter of membrane area per centimeter head of electrolyte. Preferably the flow rate with a 25 centimeter head of potassium chloride is about 0.3 microliter per minute per square millimeter of membrane area. The membrane has smooth surfaces and a low electrical resistivity when electrolyte is in the pores.

The invention facilitates changing of the ionic junction flow control structure and provides a system that is particularly useful in providing reliable measurements on minute samples of precious fluids in an automated flow through system which can be subjected to temperature and pressure cycles such as those encountered in the automated handling of fluid.

Other objects, features and advantages will be seen as the following description of a particular embodiment progresses, in conjunction with the drawings, in which.

DESCRIPTION OF PARTICULAR EMBODIMENT

Figure 1:
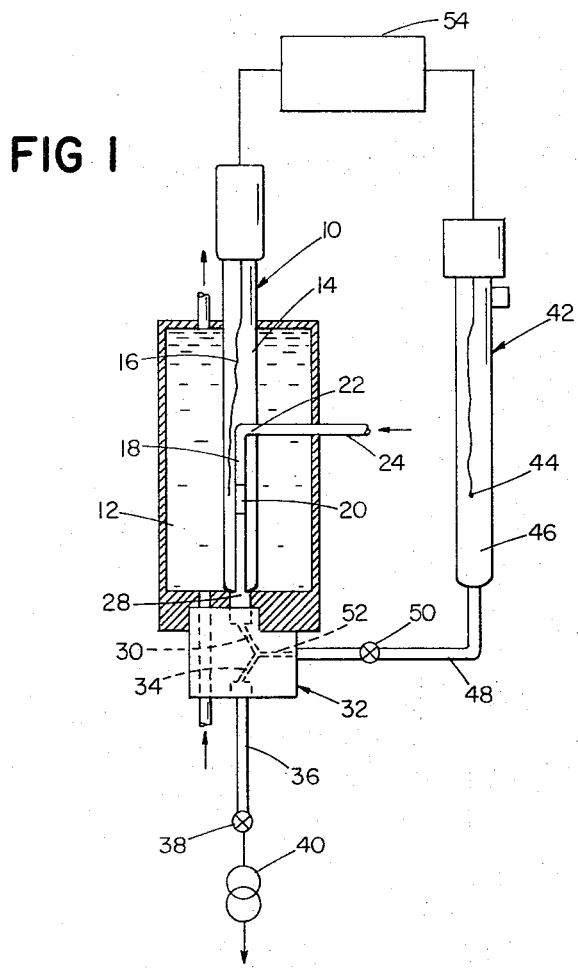
FIG. 1 is a diagrammatic view of an electrochemical electrode system in accordance with the invention.

In FIG. 1 there is shown a pH electrode 10 in a water bath 12. The pH electrode 10 includes a chamber 14 having a silver-silver chloride sensing electrode 16 in it. A glass tube 18, one section 20 of which is composed of pH sensitive glass is also in chamber 14 and has an inlet end 22 connected to sample inlet 24 and an outlet end 28 that is connected to conduit 30 of liquid junction structure 32. Liquid flows from the liquid junction structure through tube 34. Flow through tube 36 is controlled by valve 38 (which is optical) and positive displacement pump diagrammatically indicated at 40.

A cooperating reference electrode 42 includes an $Hg/Hg_2Cl_2$ (calomel) electrode 44 disposed in chamber 46 that is filled with a suitable electrolyte such as KCl. Tube 48 supplies electrolyte via valve 50 to conduit 52 in the liquid junction structure 32. Electrodes 16 and 44 are connected to measuring circuit 54 which provides an indication of the sum of potentials in the system between electrode 10 and 42.

Figure 2:
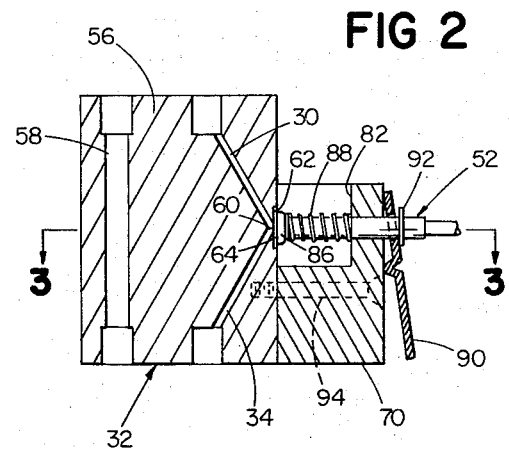
FIG. 2 is a sectional view showing details of the liquid junction structure employed in the embodiment shown in FIG. 1.
Figure 3:
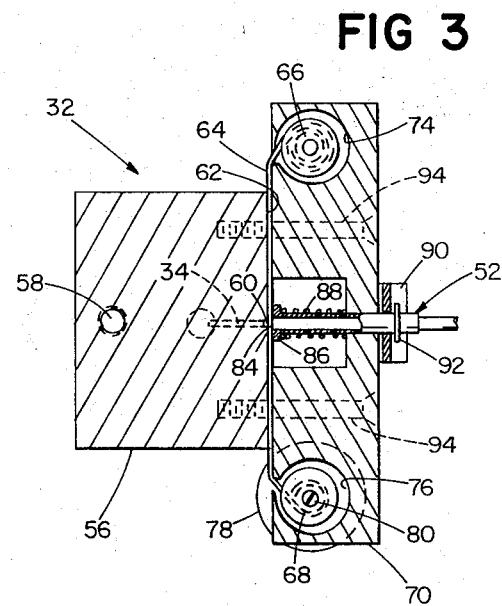
FIG. 3 is a sectional view taken along the line 3—3 of FIG. 2.
Figure 4:
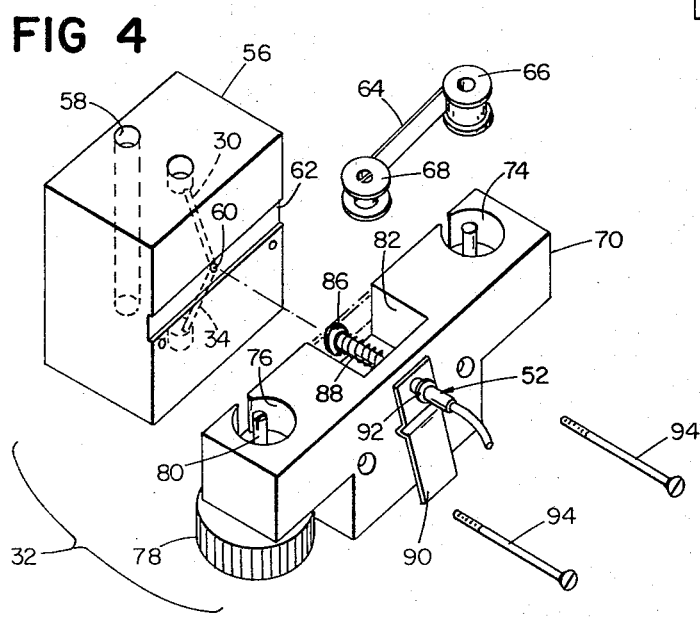
FIG. 4 is a perspective diagrammatic view showing features of the liquid junction structure shown in FIGS. 2 and 3.

Additional details of the liquid junction structure 32 may be seen with reference to FIGS. 2–4. That structure includes member 56 that has through passage 58 connected to water bath 12; inlet blood flow passage 30, 0.75 millimeter in diameter, that is connected to outlet 28 of electrode 10, and exit passage 34 of the same diameter as passage 30. Passages 30 and 34 are disposed at an angle of 120° to one another, and at the junction of passages 30 and 34, an external port, or opening, 60 (FIG. 4) about 1 millimeter in diameter, is formed. Guide structure, in the form of groove 62, extends past port 60. Disposed in groove 62 is a strip 64 of polycarbonate material which extends from supply reel 66 to take up reel 68.

Cooperating member 70 has a surface that overlies and is clamped against the face of block 56 and secures tape 64 in groove 62. Member 70 also has two spaced recesses 74, 76 in which are received the reels 66, 68, respectively. A drive 78 connected to shaft 80 in recess 76 enables takeup reel 68 to be easily rotated.

Also carried by member 70 is conduit 52, the end of which is disposed in recess 82. Conduit 52 has an outlet port, or opening, 84 about 2 millimeters in diameter. Disposed on conduit 52 adjacent its outlet port is disc 86. Spring 88 which biases orifice 84 towards flow control strip 64 in groove 62. Lever 90 cooperates with disc 92 also carried by conduit 52 and allows orifice 84 to be retracted (moved towards the right in FIG. 2) compressing spring 88. Bolts 94 secure member 70 to member 54.

The polycarbonate strip 64 is about 10 microns in thickness and has a multiplicity of parallel through passages or pores, each about 0.1 micron in diameter, the pore density being about $3 \times 10^8$ per square centimeter. These passages or pores thus provide a multiplicity of minute ionic junction passages. Spring 88 clamps conduit port 84 against strip 64 to seal that strip against orifice 60. The potassium chloride electrolyte in chamber 46 is supplied to orifice 84. This junction system provides a flow rate of about 0.01 microliter per minute per square millimeter per centimeter head of KCl; and has an electrical resistance of about 2 ohms.

In operation, a sample of blood is induced into tube 18 and liquid junction structure 32 under the influence of pump 40. A measurement of the potentials by circuitry 54 provides an indication of the pH of the blood sample. After the measurement is completed, the blood sample is removed from the system by pump 40 and the flow passage is cleaned by passing a flushing solution serially through tubes 24, 18, 30, 34 and 36. The leak structure 32 provides a smooth flow of sample and cleaning solution past orifice 60 such that the exposed surface of tape 64 is cleaned. Should it be desired to change the leak junction membrane, valve 50 is closed and clamp member 90 operated to release the clamping pressure of port 84 on tape 64. Then thumb wheel 78 is rotated to advance a fresh section of membrane in front of port 60. Lever 90 is then released allowing spring 88 to clamp orifice 84 against the new section, valve 50 opened and the system is ready for further operation. Thus the flow control element of the ionic junction is readily changed in an arrangement that does not require disassembly of electrode system components and subsequent recalibration of the electrode system, for example.

While a particular embodiment of the invention has been shown and described, various modifications thereof will be apparent to those skilled in the art, and therefore it is not intended that the invention be limited to the disclosed embodiment or to details thereof, and departures may be made therefrom within the spirit and scope of the invention as defined in the claims.

What is claimed is:

1. An electrochemical electrode system including a sensing electrode system that includes a first chamber adapted to contain a sample to be analyzed and a sensing electrode in communication with said first chamber, a reference electrode system that includes a second chamber adapted to contain an electrolyte and a reference electrode in communication with said second chamber, and an ionic junction structure including first passage structure connected to said first chamber, said first passage structure having an opening therein, second passage structure connected to said second chamber, said second passage structure having an opening therein, said openings being in juxtaposed relation, and a porous member having a section disposed between said openings to permit restricted flow between said openings, said member being movable to remove said one section from between said openings and concurrently to place another section between said openings.

2. The system as claimed in claim 1 and further including means for resiliently biasing one of said passage structures against said member, and means for reducing the biasing force to facilitate movement of said member.

3. The system as claimed in claim 1 wherein said member is an elongated strip and said system includes supply structure and take up structure for advancing said strip past said juxtaposed openings.

4. The system as claimed in claim 1 wherein the member has a multiplicity of parallel pores therethrough, the diameter of each pore being less than one-half micron such that a multiplicity of ionic junctions are adapted to be provided.

5. The system as claimed in claim 1 wherein said member is a thin membrane having a multiplicity of parallel pores that are substantially equal in length, the density of said pores in said membrane being at least about $10^8$ per square centimeter, and wherein the pore dimensions of said membrane are such that the flow rate of electrolyte through said pores is less than 0.1 microliter per minute per square millimeter of membrane area per centimeter head of electrolyte.

6. The system as claimed in claim 1 wherein said first passage structure includes inlet and outlet portions, said inlet and outlet portions being disposed at an angle to one another and said opening in said first structure being adjacent the junction of said inlet and outlet portions.

7. The system as claimed in claim 1 wherein said member is an elongated strip arranged to be advanced past said juxtaposed openings.

8. The system as claimed in claim 7 and further including means for resiliently biasing one of said passage structures against said member, and means for reducing the biasing force to facilitate movement of said member.

9. The system as claimed in claim 8 wherein said first structure includes inlet and outlet portions, said inlet and outlet portions being disposed at an angle to one another and said opening in said first passage structure being adjacent the junction of said inlet and outlet portions.

10. The system as claimed in claim 9 wherein said member is a thin membrane having a multiplicity of parallel pores that are substantially equal in length, the density of said pores in said membrane being at least about $10^8$ per square centimeter, and wherein the pore dimensions of said membrane are such that the flow rate of electrolyte through said pores is less than 0.1 microliter per minute per square millimeter of membrane area per centimeter head of electrolyte.

11. An electrochemical electrode system including a sensing electrode system that includes a first chamber adapted to contain a sample to be analyzed and a sensing electrode in communication with said first chamber, a reference electrode system that includes a second chamber adapted to contain an electrolyte and a reference electrode in communication with said second chamber, and an ionic junction structure including first structure connected to said first chamber, said first structure having an opening therein, second structure connected to said second chamber, said second structure having an opening therein, said openings being in juxtaposed relation, a movable porous flow control member having a section disposed between said openings, means for moving said member so that said section is removed and concurrently replaced by another section, guide structure for establishing straight line motion of one opening-defining structure toward the other opening-defining structure and alignment of the two openings with said flow control member disposed between said openings for providing a controlled liquid flow path for establishing an ionic junction between the electrolyte and the sample material to be measured by the electrode system, and structure for maintaining surfaces of said opening-defining structures in juxtaposed clamping relation on the said section of the flow control member interposed between said openings.

12. The system as claimed in claim 11 wherein the last-mentioned structure includes means for resiliently biasing one of said structures against said member.

13. The system as claimed in claim 11 wherein said member is an elongated strip, and said means for moving said member further includes supply structure and take up structure for advancing said strip past said juxtaposed openings.

* * * * *